United States Patent

Brown et al.

[11] Patent Number: 4,632,686
[45] Date of Patent: Dec. 30, 1986

[54] METHOD OF MANUFACTURING QUARTZ GLASS CRUCIBLES WITH LOW BUBBLE CONTENT

[75] Inventors: David R. Brown, Beverly, Mass.; Charles E. Frost, Jr., Exeter; Kenneth A. White, Raymond, both of N.H.

[73] Assignee: GTE Products Corporation, Stamford, Conn.

[21] Appl. No.: 832,614

[22] Filed: Feb. 24, 1986

[51] Int. Cl.⁴ ............................................. C03B 19/04
[52] U.S. Cl. ..................................... 65/18.1; 65/18.2; 65/35; 65/71; 65/302; 264/101; 264/102; 264/311
[58] Field of Search .................... 65/302, 71, 35, 18.1, 65/18.2, 144; 264/101, 102, 311

[56] References Cited

U.S. PATENT DOCUMENTS

| 3,853,520 | 12/1974 | Rau | 65/302 X |
| 3,902,885 | 9/1975 | Rau | 65/302 |
| 4,416,680 | 11/1983 | Brüning et al. | 65/18.1 X |

FOREIGN PATENT DOCUMENTS 0072714  6/1977  Japan ................................ 65/18.1

Primary Examiner—Arthur Kellogg
Attorney, Agent, or Firm—James Theodosopoulos

[57] ABSTRACT

In the manufacture of a quartz glass crucible of low bubble content, a first layer of granular quartz material is disposed on the interior of a rotating mold through the walls of which a vacuum can be drawn. A second layer of finer quartz material is then disposed on the first layer. The quartz material is then heated, melted and fused to form a crucible.

3 Claims, 1 Drawing Figure

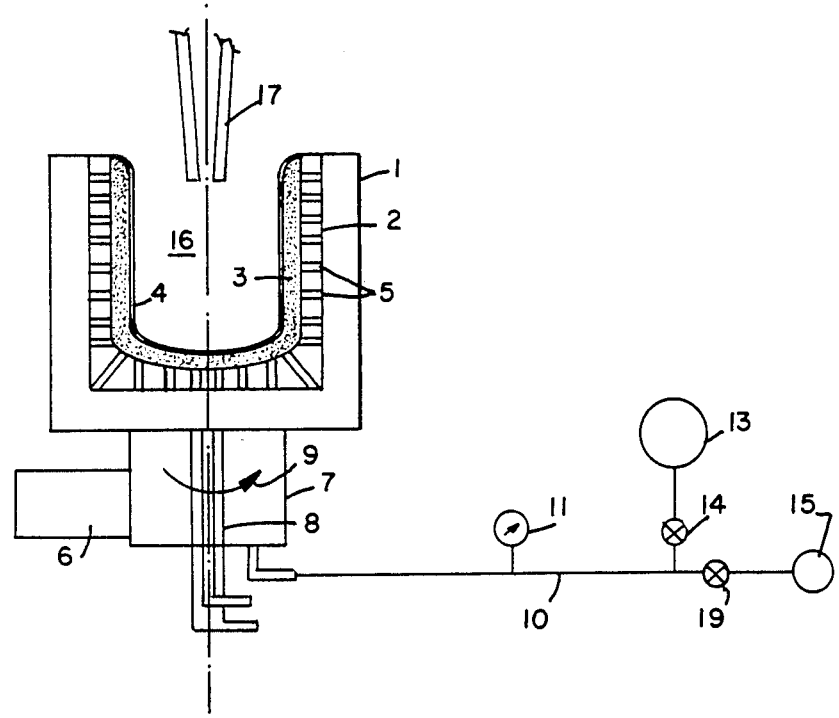

METHOD OF MANUFACTURING QUARTZ GLASS CRUCIBLES WITH LOW BUBBLE CONTENT

This invention relates to an improved method for manufacturing quartz glass crucibles of low bubble content for use in making monocrystalline silicon for semiconductor applications.

It is general practice to make quartz crucibles by pouring crystalline quartz sand or amorphous quartz powder into the interior of a mold which rotates around a vertical axis. The rotation holds the starting material against the mold walls by centrifugal force. Heat is then generated by an electric arc, or other means, to the interior of the mold to fuse the particles into an amorphous glass. Fusion will start at the interior surface and gradually melt glass toward the relatively cooler mold. The process will continue until an adequate thickness of glass is formed and a layer of calcined material will be left between the quartz crucible and mold. The crucible can then be removed from the mold.

U.S. Pat. No. 4,416,680 discloses a method in which crystalline quartz sand or amorphous quartz powder is introduced into a rotating mold which has small holes approximately 0.5 mm diameter for applying a vacuum on the quartz material. A vacuum pump is used to obtain a pressure less than 5000 Pa, and preferably less than 1000 Pa, in a vacuum cavity travelling to the mold. The vacuum is applied to the outside of the quartz material. When the material is heated and melted, the vacuum applied will remove gas from the material as it is melted, resulting in a quartz glass low in bubble content. The problem with using the mold with 0.5 mm holes for the vacuum is that bridging of the quartz particles is not always certain and some particles will go through the holes. Also, the 0.5 mm diameter holes offer high resistance to the vacuum. Since the vacuum actually reaching the quartz is not great, this process will not be optimum for removing all bubbles. Another disadvantage to this method is that the mold cost is very high due to considerable machining costs of drilling many 0.5 mm diameter holes, especially if made in a hard material such as the steel referenced in that patent.

Another method described in the patent involves the use of a porous material as the mold capable of transferring vacuum. The disadvantage to using this material is that it will oxidize rapidly, react with the quartz material and have extremely short life, especially if not cooled during the process. The initial cost of this type of mold is high and would not be economical for a repetitive manufacturing process.

This invention discloses a method for making quartz crucibles of lower bubble content than prior art methods.

In this invention two sizes of granular quartz material are used. The first material used, that is, the material in contact with the mold, is relatively coarse quartz material. This permits ready transfer of vacuum therethrough. The second material used, that is, the material overlying the first material, is relatively fine quartz material. This second material packs denser than the first material with the result that less air will pass therethrough, thereby improving the vacuum that is removing the gas bubbles.

The first material used will have a particle size distribution all between about 297 microns and 105 microns. The material will pack so that gas will pass through it. On the inside of this material, a layer of finely ground crystalline quartz or amorphous quartz is introduced around the entire inside surface. This comminuted material is considerably smaller than that used in prior art methods. Its particles will all range in size between about 120 microns and 44 microns. This fine material will pack more densely and become a block to the ambient air being drawn in at the inside surface. This results in less loss of vacuum due to ambient air coming in from the inside of the mold. A higher vacuum is obtained on the quartz starting material which is indicated by an increase in vacuum at a vacuum gauge on the vacuum line connected to the tooling. The higher vacuum will be capable of removing gas either trapped as voids or gas generated by heating the quartz material when the heat source is introduced to the material.

When the fine material, which is the first to fuse, becomes glass, it will fuse to a glass with extremely low bubble content near the surface due to its dense packing and high vacuum. When the inside surface becomes glass, it seals over the raw material and the vacuum will increase even further, for the remainder of the heating process.

The absence of bubbles within the wall of the quartz glass and especially near the inside surface, is extremely important to the silicon crystal growers. The absence of bubbles inside the glass and close to the interior surface is desirable because the inside surface of the quartz crucibles is dissolved away for approximately 1 mm during the crystal growing process. Any bubbles in this area can possibly be uncovered or rupture and introduce a quartz particulate into the silicon melt. In vacuum type crystal pullers the gas pressure inside the bubble is a critical factor. If the pressure inside the bubble is higher than that of the vacuum inside the furnace, and at temperatures which the crucible is heated, the pressure inside the bubble can increase and the viscosity of the quartz at these temperatures is low enough so that bubbles will expand in size. This expansion can cause the bubble near the inside surface to rupture into the melt, releasing quartz particulates. A quartz particulate can interrupt the single crystal process or end up in the silicon crystal.

Bubbles which get uncovered during the crystal growing process can also be the site for the formation of cooled silicon which will solidify and start the formation of a secondary crystal from the quartz crucible. This secondary crystal can grow into the melt and interrupt the crystal growing process.

The lack of bubbles within the glass can also increase the strength of the quartz crucible structure at high temperatures since the viscosity of the quartz decreases at these temperatures to the point where the crucible can sag or sump. The absence of voids will leave more material to hold up the weight of the glass above it.

The drawing illustrates apparatus useful for repetitive manufacture of quartz crucibles having low bubble content.

An exterior housing 1 has separate cavities (not shown) for water cooling and for applying a vacuum to the tooling mold 2. Water cooled molds are preferred to uncooled molds to maintain life and dimensional stability of the molds, which can oxidize at extreme temperatures needed to melt the quartz. The entire housing and mold assembly is rotated using an external drive motor 6 and a rotating spindle 7. The rotating spindle assembly 7 is capable of transferring vacuum to the housing 1. The spindle 7 also has another fitting 8 within to transfer water to and from the housing 1. The spindle 7 and housing 1 rotate as indicated by arrow 9. Vacuum is applied to the housing 1 and spindle 7 through a pipe 10. Suitable vacuum can be supplied by a pump 13 rated at least at 40 cfm, preferably 100 cfm. A vacuum gage 11 is used for monitoring pressure corresponding to pressure in the vacuum cavities.

First quartz material 3 is poured into mold 2 and then finer second quartz material 4 is poured thereover, to cover material 3. Material 4 immediately increases the vacuum by about 75 to 100 mm Hg, as read on gauge 11. Mold tooling 2 can be either graphite or heat resistant steel alloy.

Quartz materials 3 and 4 inside the mold are then heated with an electric arc produced between electrodes 17 which will first sinter and then melt the material. The interior surface of material 3 will start to melt first which seals the vacuum even further from the inside of cavity 16 at ambient conditions. The vacuum at this point will increase further. The fine quartz material, packed densely, will fuse into glass low in microscopic bubble content. The heat will fuse the glass thicker and the process will be stopped when a suitable thickness is formed. The entire cross section of the glass will be substantially free of bubbles; only a few microscopic bubbles will remain. The addition of finer quartz to the inside surface significantly reduces bubbles including microscopic bubbles to a level lower than that obtained in the prior art. The vacuum and rotation are maintained throughout the heating process to remove bubbles and maintain dimensions of the crucible.

When the heating process is complete, the crucible can be removed from the tooling 2 by closing valve 14 to the vacuum pump and opening valve 19 to the compressed air source 15, which will pressurize the vacuum cavity and force the crucible out. The tooling 2 can also be made in two pieces, a removable sleeve and a non-removable base, for removing the crucible.

The crucible will stay inside the sleeve when it is removed and then the remaining sand between the tooling and the crucible can be tapped or vibrated out to free the crucible.

This process is also enchanced by using water cooled tooling because during fusion of the glass, high temperatures are generated which oxidize and erode the tooling. The layer of quartz sand remaining between the crucible and tooling will not stop the slow oxidation of the tooling over time, whether the tooling is graphite or a heat resistant steel, without water cooling. Therefore, having water cooled tooling is an advantage for tooling life and to lower the cost of manufacturing.

The heat generated in the process will also expand the tooling during the fusion process to the point that when the process is complete, the tooling will contract and make it difficult or impossible to remove the crucible. The thermal expansion of quartz is much less than that of the tooling so that the tooling will compress the crucible and even crack it. This compression is minimized by using water cooled tooling kept at a constant water temperature during the process. This will reduce expansion and contraction of the tooling so that the crucible will be easy to remove.

The expansion, contraction and oxidation of the tooling could also be reduced by designing the tooling with a larger inside diameter to leave more quartz starting material to be left over between the crucible and the tooling. The thicker amount of sand will insulate the tooling from the heat so that it will not oxidize as rapidly or expand and contract as much to facilitate in crucible removal. This process, however, is costly because significantly more of the expensive starting material is used. The cost of the high purity starting material is so high that it is impractical to waste it by using any excess during the process. The starting material left over after fusion is not suitable for reuse in the semiconductor grade crucible process since it will contain impurities from the tooling. Therefore it is wise to use only a minimal amount of insulative sand for a barrier to react with the tooling and for heat insulation.

Finely ground quartz material 4 can be obtained through a variety of means, but preferably in a mill using quartz glass pieces as the media. The mill container should also be made of a cylindrical polypropylene material or a cylindrical quartz tube with quartz end plates. The quartz glass media used to grind the material were approximately 6 cm square and 7.5 mm thick. Either crystalline quartz sand or amorphous quartz glass can be ground into fine material.

We claim:

1. The method of making a quartz glass crucible of low bubble content comprising the steps of preparing a mold having holes therethrough through which a vacuum can be drawn, disposing the mold on a rotatable spindle through which a vacuum can be drawn, rotating the mold while drawing a vacuum on the interior of the mold through said holes, pouring granular quartz material into the mold to form a first layer thereof on the interior of the mold, pouring quartz material finer than said granular quartz material into the mold to form a second layer thereof on the first layer, applying heat to the interior of the mold to melt and fuse the quartz material to form a crucible, and removing the crucible from the mold.

2. The method of claim 1 wherein the granular quartz material has a particle size distribution of about 297 to 105 microns.

3. The method of claim 2 wherein the finer quartz material has a particle size distribution of about 120 to 44 microns.

* * * * *